United States Patent
Jespersen

(10) Patent No.: US 9,930,832 B2
(45) Date of Patent: Apr. 3, 2018

(54) MOWER WITH RECONFIGURABLE CROP MATERIAL EJECTION

(71) Applicant: KVERNELAND GROUP KERTEMINDE AS, Kerteminde (DK)

(72) Inventor: Peter Jespersen, Vejen (DK)

(73) Assignee: Kverneland Group Kerteminde A/S, Kerteminde (DK)

( * ) Notice: Subject to any disclaimer, the term of this patent is extended or adjusted under 35 U.S.C. 154(b) by 0 days.

(21) Appl. No.: 14/906,736

(22) PCT Filed: May 23, 2014

(86) PCT No.: PCT/EP2014/060656
§ 371 (c)(1),
(2) Date: Jan. 21, 2016

(87) PCT Pub. No.: WO2015/010808
PCT Pub. Date: Jan. 29, 2015

(65) Prior Publication Data
US 2016/0157425 A1    Jun. 9, 2016

(30) Foreign Application Priority Data

Jul. 22, 2013   (EP) .................................... 13177484

(51) Int. Cl.
*A01D 43/00* (2006.01)
*A01D 34/66* (2006.01)
(Continued)

(52) U.S. Cl.
CPC ......... *A01D 43/003* (2013.01); *A01D 34/661* (2013.01); *A01D 34/664* (2013.01);
(Continued)

(58) Field of Classification Search
CPC .... A01D 43/003; A01D 43/06; A01D 34/661; A01D 34/664; A01D 34/668;
(Continued)

(56) References Cited

U.S. PATENT DOCUMENTS 2,484,981 A   10/1949 Coultas
3,324,639 A   6/1967 Halls et al.
(Continued)

FOREIGN PATENT DOCUMENTS

DE   1810878 C2   7/1984
DE   29614199 U1  10/1996
(Continued)

OTHER PUBLICATIONS

Search Report from corresponding European Patent Application No. 13177484.6, dated Dec. 12, 2013, in 7 pages.
(Continued)

*Primary Examiner* — Alicia Torres
*Assistant Examiner* — Adam J Behrens
(74) *Attorney, Agent, or Firm* — Knobbe, Martens, Olson & Bear, LLP

(57) ABSTRACT

A plain mower includes a plurality of rotary cutters for cutting a crop and a swathing unit for forming the cut crop material into a swath. The swathing unit includes an auger that rotates about an axis to transport crop material axially through the swathing unit. The swathing unit can be configured in a first configuration in which the crop material is ejected axially from the auger, and can be reconfigured in a second configuration in which the crop material is ejected radially from the auger.

13 Claims, 12 Drawing Sheets

(51) Int. Cl.
*A01D 57/30* (2006.01)
*A01D 75/30* (2006.01)
*A01D 101/00* (2006.01)

(52) U.S. Cl.
CPC ............ *A01D 34/668* (2013.01); *A01D 57/30* (2013.01); *A01D 75/303* (2013.01); *A01D 2101/00* (2013.01)

(58) Field of Classification Search
CPC ...... A01D 57/00–57/30; A01D 75/303; A01D 84/00; A01D 2101/00
See application file for complete search history.

(56) References Cited

U.S. PATENT DOCUMENTS

| | | | |
|---|---|---|---|
| 3,479,805 A | 11/1969 | Soteropulos | |
| 3,717,981 A | 2/1973 | Van der Lely | |
| 3,841,070 A * | 10/1974 | Scarnato | A01D 84/00 56/14.4 |
| 4,330,982 A * | 5/1982 | Vissers | A01D 57/30 56/14.5 |
| 4,392,339 A * | 7/1983 | Berlivet | A01D 57/30 56/13.6 |
| 4,550,554 A * | 11/1985 | Lundahl | A01D 34/412 56/121.42 |
| 4,739,609 A | 4/1988 | Meier et al. | |
| 5,076,042 A * | 12/1991 | Koorn | A01D 34/661 56/13.8 |
| 5,778,647 A * | 7/1998 | McLean | A01D 34/664 56/13.6 |
| 5,901,541 A * | 5/1999 | Lindquist | A01D 89/007 171/58 |
| 5,930,988 A * | 8/1999 | Hanson | A01D 57/00 56/16.4 A |
| 6,058,688 A | 5/2000 | Krambeck et al. | |
| 6,093,099 A | 7/2000 | Groff | |
| 6,508,050 B1 * | 1/2003 | Krone | A01D 57/30 56/192 |
| 6,662,539 B1 * | 12/2003 | Adams | A01D 57/30 56/158 |
| 6,854,251 B2 | 2/2005 | Snider | |
| 7,500,341 B2 * | 3/2009 | Hironimus | A01D 57/20 56/6 |
| 2001/0003239 A1 * | 6/2001 | Franet | A01D 34/667 56/153 |
| 2004/0221562 A1 | 11/2004 | Snider | |
| 2005/0252183 A1 * | 11/2005 | Hironimus | A01D 75/30 56/6 |
| 2009/0293439 A1 | 12/2009 | Phillips | |
| 2010/0031622 A1 * | 2/2010 | Frey | A01D 43/077 56/366 |
| 2011/0005181 A1 | 1/2011 | Albertsson et al. | |
| 2011/0047948 A1 | 3/2011 | Thompson | |
| 2011/0302897 A1 | 12/2011 | Hoffman et al. | |
| 2016/0029560 A1 * | 2/2016 | Jespersen | A01D 34/668 56/189 |
| 2016/0088795 A1 * | 3/2016 | Karlsson | A01D 43/06 56/153 |
| 2017/0006760 A1 | 1/2017 | Nielsen | |

FOREIGN PATENT DOCUMENTS

| | | |
|---|---|---|
| EP | 0061818 A1 | 10/1982 |
| EP | 0558437 A1 | 9/1993 |
| EP | 0593377 A1 | 4/1994 |
| EP | 0945051 B1 | 7/2003 |
| EP | 1389413 A2 | 2/2004 |
| EP | 1321027 B1 | 2/2008 |
| EP | 2789224 A1 | 10/2014 |
| GB | 1597276 A | 9/1981 |
| GB | 2088684 A | 6/1982 |
| WO | WO 01/03494 A1 | 1/2001 |
| WO | WO 2014/166802 A1 | 10/2014 |
| WO | WO 2015/010808 A1 | 1/2015 |
| WO | WO 2015/097230 A1 | 7/2015 |

OTHER PUBLICATIONS

International Search Report from corresponding International Patent Application No. PCT/EP2014/060656, dated Oct. 16, 2014, in 4 pages.
Notice of Opposition received in related European Patent No. EP 2829168, dated Jan. 6, 2017, in 21 pages.
Kverneland's Response to Notice of Opposition in related European Patent No. EP 2829168, dated Jun. 21, 2017, in 24 pages.
Krone, "BiG M420 SP high-performance mower conditioner" Brochure and Technical Data, Feb. 2016, in 28 pages.
Krone, "BiG M420 Selbstfahrender Hochleistungs-Mahaufbereiter" Brochure and Technical Data, Oct. 2011, in 28 pages.
Krone, "BiG M II Heavy-Duty Mower Conditioner" Brochure, Jan. 2008, in 20 pages.
Krone, "BiG M II Hochleistungs-Mahaufbereiter" Brochure, Oct. 2005, in 20 pages.
Krone, "BiG M 500 High-capacity SP mower conditioner" Brochure and Technical Data, Nov. 2011, in 24 pages.
Krone, "BiG M 500 Selbstfahrender Hochleistungs-Mahaufbereiter" Brochure and Technical Data, Oct. 2011, in 24 pages.

* cited by examiner

MOWER WITH RECONFIGURABLE CROP MATERIAL EJECTION

CROSS REFERENCE

This application is a U.S. National Phase of PCT International Application No. PCT/EP2014/060656, filed May 23, 2014 and published as WO 2015/010808 on Jan. 29, 2015, which claims priority to European Application No. 13177484.6, filed Jul. 22, 2013. The entire disclosure of each of the above-identified applications is hereby incorporated by reference.

BACKGROUND

Field

The present disclosure relates to a mower. In particular it relates to a plain mower having a plurality of rotary cutter heads for cutting a crop and a swathing unit for forming the cut crop into a swath for collection.

Certain Related Art

It is known to mount two or more mowers on a tractor in order to provide a large cutting width. Typically, a front mower unit is mounted in front of the tractor and one or more rear mower units are mounted behind the front mower unit and extend out sideways beyond one or both ends of the front mower to increase the overall cutting width. Typically, the rear mower units are mounted on the rear of the tractor, although they can alternatively be mounted on the front or the sides of the tractor. The swath of cut crop produced by the front mower is guided between the wheels of the tractor so that it is not crushed into the ground by the tractor wheels. The swaths produced by the rear mower units are deposited to the sides of the tractor. This provides a large swath width, which aids drying of the cut crop.

Once the cut crop has dried it can be raked into a single swath and collected or baled in a conventional manner. However, the need for a separate raking step prior to collection increases the cost and the complexity of collecting the crop.

If wide spreading of the cut material is not required, the costs associated with harvesting the crop can be reduced by collecting the swaths produced by the front mower unit and the rear mower units into a single swath of reduced width. Such an arrangement is described in U.S. Pat. No. 3,717,981, which relates to a mowing machine having a front mower unit mounted on the front of a tractor and a rear mower unit mounted on one side of the tractor. The rear mower unit is provided with an auger that transports the cut crop inwards so that it is combined beneath the tractor with the swath produced by the front mower unit.

European Patent Document No. EP 1389413A1 describes another mowing machine that has a front mower unit mounted on the front of a tractor and two rear mower units mounted on the rear of the tractor. The rear mower units are provided with conveyor belts, which transport the side swaths inwards so that they are combined with the swath produced by the front mower unit.

SUMMARY

The aforementioned patents can suffer from one or more problems. For example, in U.S. Pat. No. 3,717,981, the rear mower unit is located between the front and rear wheels of the tractor and throws the cut crop underneath the tractor just in front of the rear wheels. This can give rise to a risk that the cut crop could be crushed by the wheels of a tractor. The arrangement can also restricts the position and size of the rear mower unit. Moreover, the mowing machine described in U.S. Pat. No. 3,717,981 appears to be a drum mower arrangement for the front and rear mower units. A disadvantage associated with this arrangement is that drum mower units provide a restricted pathway for the cut crop, which limits the capacity of the mower unit. As mentioned above, European Patent Document No. EP 1389413A1 describes rear mower units that is provided with conveyor belts; however, the use of conveyor belts requires that the rear mower units are provided with conditioner units, which rotate to lift the cut crop onto the conveyor belts. This adds weight to the mower unit and increases the amount of energy required to drive the unit.

It is an object of the present disclosure to provide a plain mower that mitigates one or more of the aforesaid problems. The term "plain mower," as used herein, refers to a mower without a conditioning unit. A conditioning unit typically comprises a rotating bar equipped with a plurality of flail arms that crush and bruise the stalks of the cut crop to aid wilting. However, a conditioning unit is not always needed and the present disclosure relates to a plain mower that does not include a conditioning unit.

According to one aspect of the present disclosure there is provided a plain mower having a plurality of rotary cutters for cutting a crop and a swathing unit for forming cut crop material into a swath, the swathing unit including an auger that rotates about a substantially horizontal axis to transport crop material axially through the swathing unit, wherein the swathing unit can be configured in a first configuration in which the crop material is ejected axially from the auger, and can be reconfigured in a second configuration in which the crop material is ejected radially from the auger.

The mower may be configured either in a first configuration in which crop material is ejected axially from the auger, or a second configuration in which the crop material is ejected radially from the auger. When the mower is in the first configuration the axially ejected crop material may be combined with the swath produced by another mower unit to form a single swath. This allows the crop material to be collected easily and quickly without the need for a separate raking step, thereby saving time and costs. Alternatively, when the mower is in the second configuration the radially ejected crop material may be placed on the ground in a separate swath to aid drying of the crop material, and to allow the use of a small rake. The mower is therefore adaptable to provide either a single swath or a number of separate swaths, according to the requirements of the operator and the prevailing conditions.

The mower is a plain mower that does not require a conditioning unit. It is therefore relatively simple and inexpensive. More importantly it is light in weight, which reduces compaction of the ground, and it has a low energy requirement. This allows a less powerful and more economical tractor to be used, which may also be of lower weight, thus further reducing compaction of the ground.

Advantageously, the swathing unit can be configured in a third configuration in which the crop material is ejected radially from the auger, the swath width in said second and third configurations being different. Preferably, in one of the second and third configurations the crop material is ejected across at least 50% of the width of the auger to create a relatively wide swath and in the other of the second and third configurations the crop material is ejected across a smaller portion of the width of the auger to create a relatively narrow swath. More preferably, in one of the second and third configurations the crop material is ejected across substantially the full width of the auger to create a wide swath and in the other of the second and third configurations the crop material is ejected across less than the full width of the auger to create a narrow swath.

The second and third configurations thus provide even more flexibility. When the crop material is ejected across substantially the full width of the auger to create a wide swath this allows for very rapid drying of the crop material. Alternatively, when the crop material is ejected across less than the full width of the auger this creates a narrower swath that can be collected easily or raked with a small rake, but which still dries rapidly (although not as rapidly as the wide swath).

Advantageously, the swathing unit includes at least one guide plate that extends around at least a part of the auger when the swathing unit is in the first configuration to hold the crop material in contact with the auger. The guide plate is preferably located beneath and behind the auger when it is in the first configuration, so that the crop material is held in contact with the auger, causing it to be transported axially by rotation of the auger.

Advantageously, the guide plate (or at least one of the guide plates) is displaced away from the auger when the swathing unit is in the second and third configurations to allow the crop material to be ejected radially from the auger. For example, when the auger is in the second or third configuration it may be either removed entirely or moved by pivoting, sliding or rotating to a location in which it does not contact the crop material.

Advantageously, the swathing unit includes a plurality of guide plates that can be reconfigured separately to adjust the position and/or the width of a swath formed by the swathing unit. Reconfiguring the guide plates allows the position and/or the width of the swath formed by the radially ejected crop material to be adjusted. This provides the operator with more control over the operation of the mower, allowing it to be adapted to the prevailing conditions.

Advantageously, the rotary cutters include disc cutters. Disc cutters are generally preferred to drum cutters as they do not obstruct the flow of cut crop material and so provide the possibility of a greater cutting rate, without increasing the risk of blockage.

The mower preferably includes a suspension mechanism for suspending the mower in a laterally displaced position relative to a tractor, in other words to one side of the centerline of the tractor.

According to another aspect of the disclosure, there is provided a mower mechanism including a rear mower unit comprising a plain mower according to any one of the preceding statements, and a front mower unit, wherein the rear mower unit and the front mower unit are configured for attachment to a tractor such that the front mower unit is in front of the tractor and the rear mower unit is located towards the rear of the tractor in a laterally displaced position, whereby when the rear mower unit is in the first configuration the axially-ejected crop material is combined with crop material cut by the front mower to produce a single swath, and when the rear mower unit is in the second configuration the radially-ejected crop material forms a swath that is displaced laterally from the crop material cut by the front mower unit.

The mower mechanism may thus be configured either in a first configuration in which crop material from the rear mower is combined with crop material from the front mower to produce a single swath, or a second configuration in which the crop material of the front and rear mowers forms two separate swaths. When the mower mechanism is in the first configuration the crop material can be collected easily and quickly without the need for a separate raking step. Alternatively, when the mower mechanism is in the second configuration the crop material is placed on the ground in a separate swath to aid drying of the crop material. The mower is therefore adaptable to provide either a single swath or a number of separate swaths, according to the requirements of the operator and the prevailing conditions.

Advantageously, the rear mower unit is configured such that when it is in the first configuration the axially ejected crop material is deposited behind one or more rear wheels of the tractor. This avoids any risk of the crop material being crushed or damaged by the rear wheels of the tractor. Preferably, the rear mower is located behind the rear wheels of the tractor: for example it may be mounted on the rear of the tractor or it may be a trailed mower unit.

Advantageously, the mower mechanism includes a plurality of rear mower units, for example two rear mower units, which may be mounted on opposite sides of the tractor.

According to another aspect of the disclosure there is provided a mowing machine including a tractor and a mower mechanism according to any one of the preceding statements mounted on the tractor.

According to another aspect of the disclosure there is provided a mowing machine including a tractor having front and rear wheels and a mower mechanism including a front mower unit located in front of the tractor and a rear mower unit located towards the rear of the tractor in a laterally displaced position, wherein the rear mower unit is a plain mower that includes a plurality of rotary cutters for cutting a crop and a swathing unit for forming the cut crop material into a swath, the swathing unit including an auger that rotates about a substantially horizontal axis to eject the crop material axially from the auger, wherein the rear mower unit is configured to deposit the axially-ejected crop material behind the rear wheels of the tractor so that the axially-ejected crop material is combined with crop material cut by the front mower unit to produce a single swath.

BRIEF DESCRIPTION OF THE DRAWINGS

Certain embodiments will now be described by way of example with reference to the accompanying drawings, wherein.

DETAILED DESCRIPTION OF CERTAIN EMBODIMENTS

The plain mower shown in FIGS. 1-3 and 10-12 of the drawings is a rear mower 2 that is designed to be mounted on the rear or sides of a tractor T, shown in FIGS. 4-9. The rear mower 2 will generally be used in combination with a front mower 4, as shown in FIGS. 4-9. This front mower 4 may for example be of the type described in European patent application No. EP 13163432.1 (Publication No. EP 2789224A1), which is designed to be mounted on the front of the tractor T and is configured to produce a front mower swath SF of adjustable width that passes between the wheels W of the tractor T.

Although the description below is in the context of a rear mower unit, it should be understood that the present disclosure is not restricted to a rear mower unit and is applicable also to front mounted mower units. The present disclosure is also applicable to mower units that are either suspended from a tractor or supported on wheels (for example towed or trailed mower units).

Figure 4:
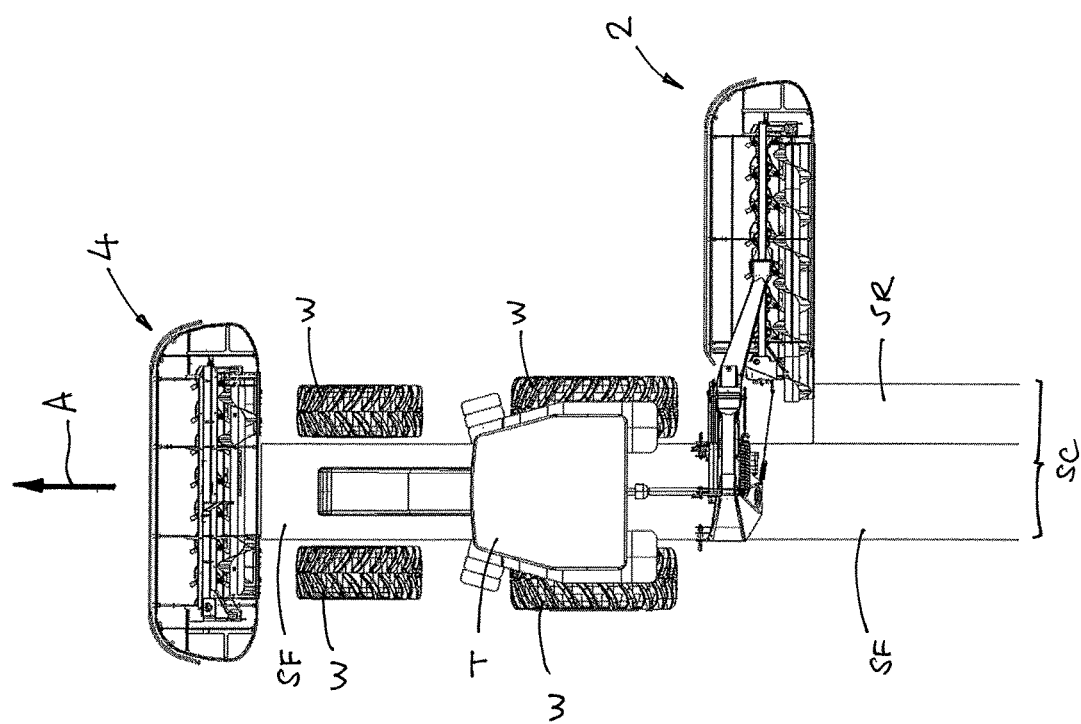
FIG. 4 is a plan view of a first mower mechanism including a front mower unit and a rear mower unit in a first configuration.

In the following description we refer to the front F and the back B (or rear) of the mower unit, which are defined with respect to the path A of the tractor T during a mowing operation, as illustrated in FIG. 4. Terms such as "in front of" or "behind" are to be interpreted in a sense that is consistent with this definition of the terms "front" and "back". We also refer to the inner and outer ends of the mower unit, which are defined with respect to the center line of the tractor.

The mower unit 2 shown in the drawings comprises a support frame 5 that supports a cutter bar 6 carrying a plurality of rotary cutter heads 8, which are equipped with knives. In this embodiment the cutter bar 6 carries eight cutter heads 8, wherein the two outermost cutter heads 8' are drum cutters and the remaining cutters 8 are disc cutters.

The cutter bar 6 extends parallel to the ground and perpendicular to the path A of the tractor. The cutter heads 8 are driven in a conventional manner from the power take-off (PTO) of the tractor and in this embodiment they rotate alternately in opposite directions. Alternatively, the rotational directions of the cutter heads may be different. The mower unit 2 includes a suspension mechanism 10 through which the mower unit 2 is attached to the rear of a tractor. The mower unit 2 also includes a support frame 12 for a protective cover or skirt (not shown).

Mounted behind the cutter bar is a swathing unit 14 that includes an auger 16, comprising a rotary shaft 18 that carries a helical flighting 20. The auger 16 extends inwards from the outermost cutter disc to a point close to or beyond the innermost cutter head. The inner end 16' of the auger thus extends inwards beyond the innermost cutter head.

In this embodiment a single flighting 20 is provided, which is configured to draw cut crop material inwards towards the path A of the tractor. Alternatively, multiple flightings may be provided.

The auger 16 is driven so that it rotates downwards about its rotary axis X: that is, the front part of the auger 16 in the mowing direction rotates downwards so that cut crop material is drawn under the rotary axis of the auger 16. The auger 16 is positioned as close as possible to the cutter heads 8 so that it grabs the cut crop quickly to ensure an even flow and good cutting quality. The rotary axis of the auger is positioned above and behind the cutter heads.

Figure 12:
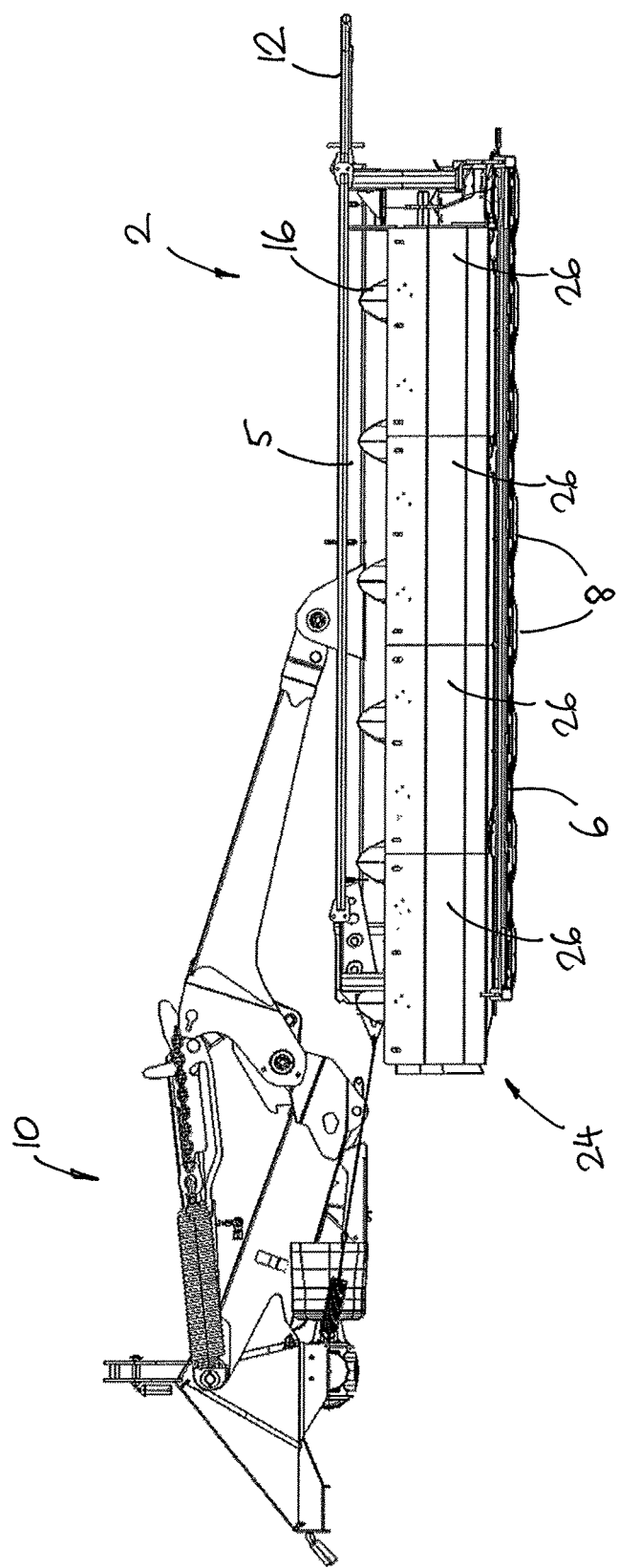
FIG. 12 is a rear view of the plain mower in the first configuration.

The swathing unit 14 also includes a housing 24 comprising one or more guide plates 26 that hold the cut crop in contact with the auger 16 so that rotation of the auger 16 causes sideways displacement of the crop. In this embodiment four guide plates 26 are provided, which are positioned end-to-end at the rear of the swathing unit as shown in FIG. 12. Each guide plate 26 comprises a bent or curved steel plate that extends around the lower and rear parts of the auger 16. Preferably, each guide plate extends around approximately 20% to 50% of the circumference of the auger.

Figure 1:
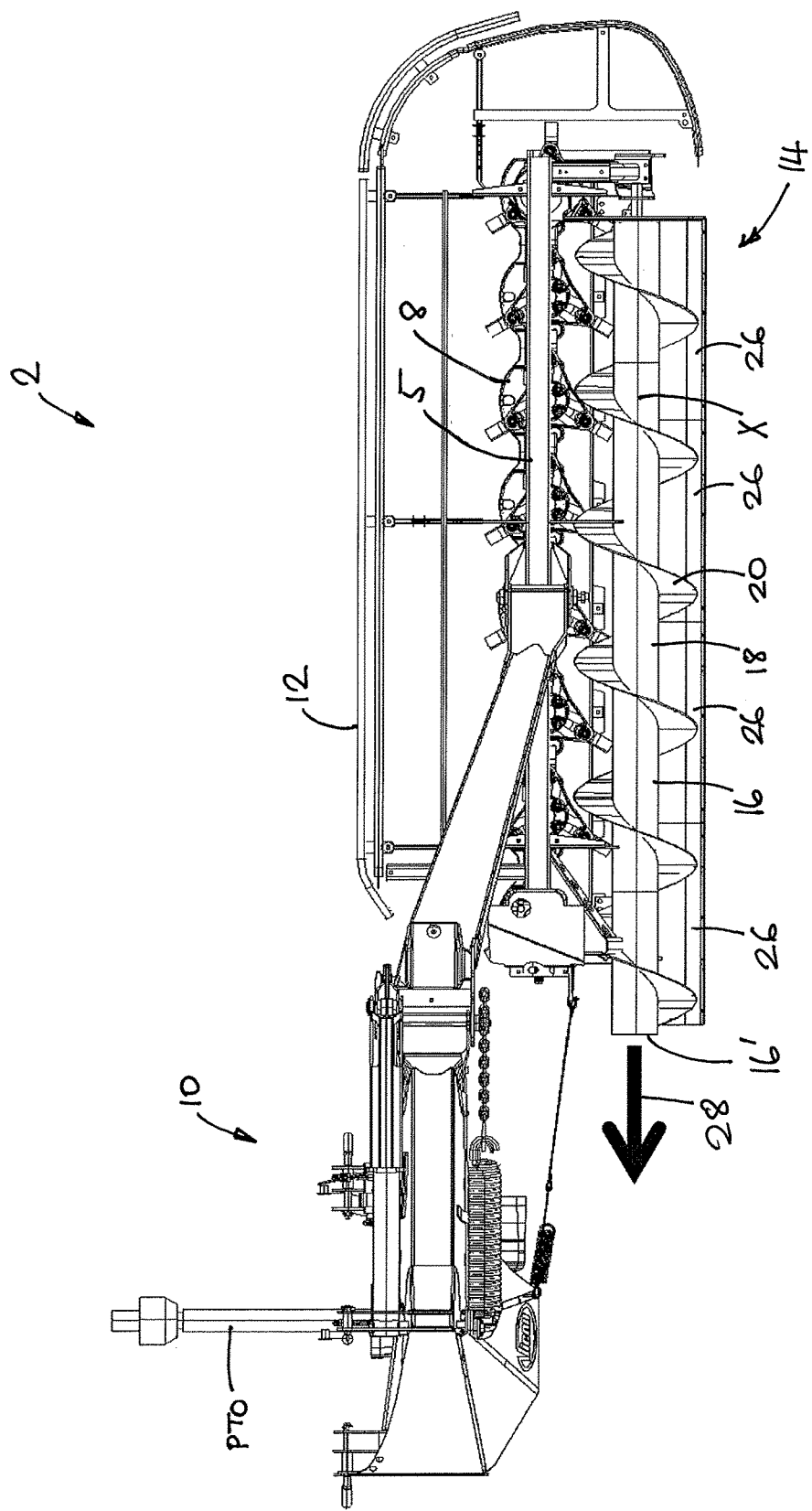
FIG. 1 is a plan view from above of a plain mower in a first configuration.

Each of the guide plates 26 is removable to allow cut crop material to be ejected radially from the auger 16 to form a rear mower swath SR. Therefore by attaching or removing the guide plates 26, the operator can control whether the cut crop material is ejected axially or radially from the auger 16. The operator can also control the width of the swath SR when the cut crop material is being ejected radially. For example, if all four guide plates 26 are attached as shown in FIG. 1, the cut crop material will be ejected axially from the inner end of the auger as indicated by the arrow 28. In this configuration the swath SR of cut crop material from the rear mower unit 2 will be combined with the swath SF of cut crop material produced by the front mower unit 4. This configuration may be chosen when for example simple operating procedures following mowing are more important than rapid drying of the crop.

Figure 2:
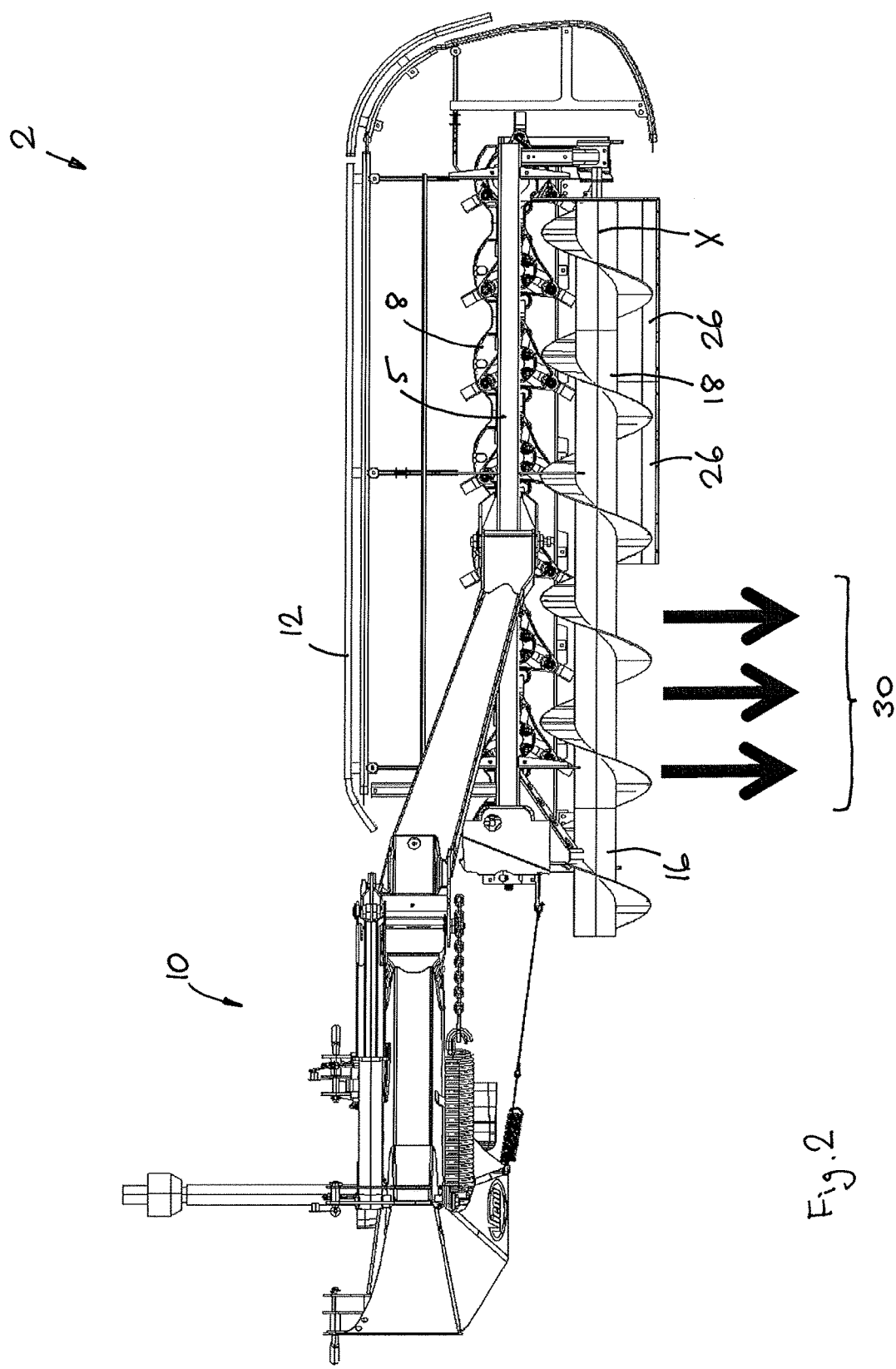
FIG. 2 is a plan view of the plain mower in a second configuration.

In a second configuration shown in FIG. 2, the two inner guide plate 2 have been removed and the two outer guide plates 26 have been left in place. Therefore, in this configuration cut crop material will be transported axially inwards towards the inner end 16' of the auger 16 until it reaches the position where the inner guide plates have been removed. The cut crop material will then be ejected radially from the auger 16 as indicated by the arrows 30. This will produce a narrow swath SR of cut crop material at the inner end of the rear mower 2. This configuration may be chosen when for example rapid drying of the crop is required but only a small rake is available for collecting the crop, while maintaining a good capacity during the subsequent raking operation.

Figure 3:
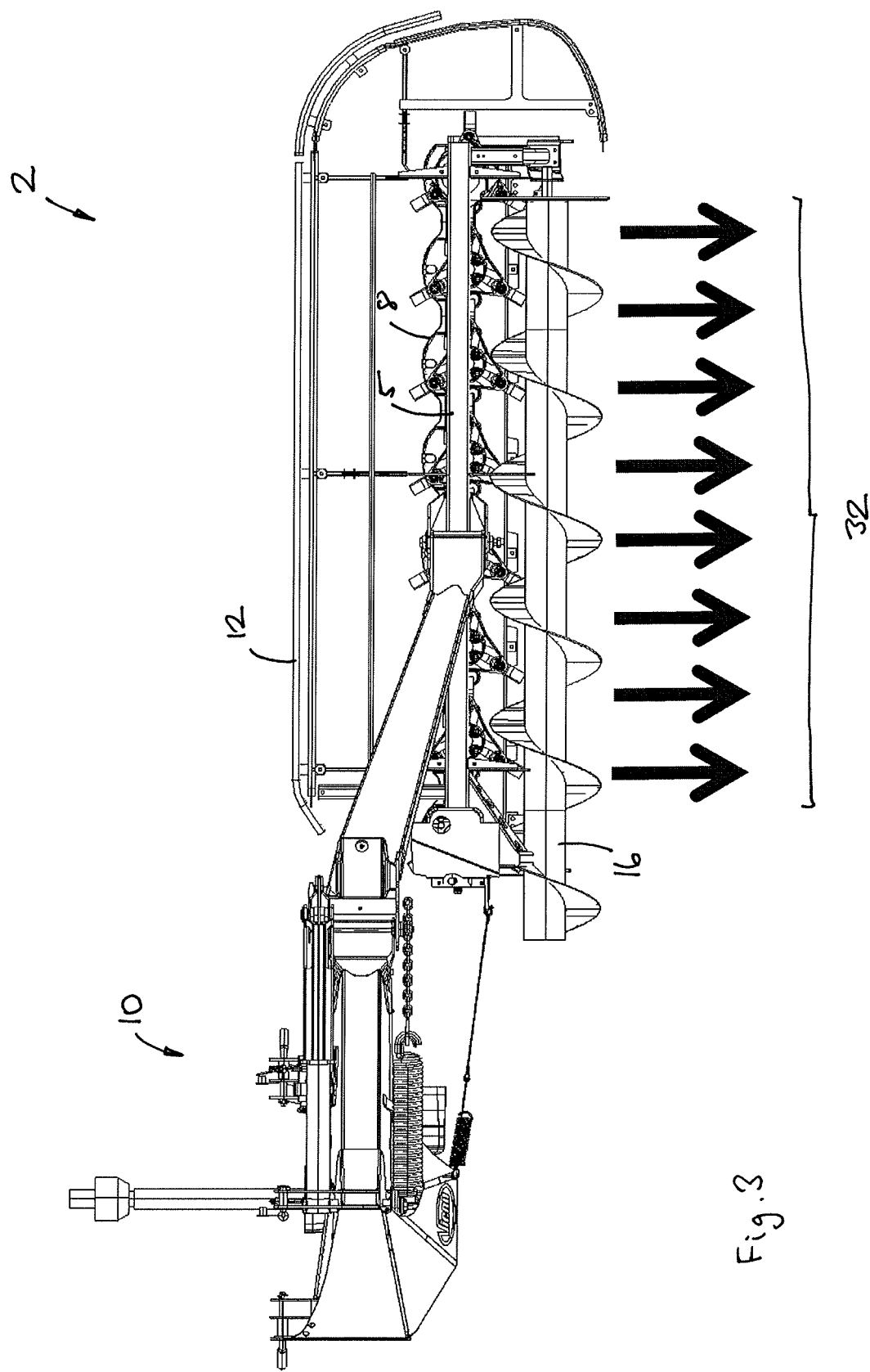
FIG. 3 is a plan view of the plain mower in a third configuration.

In a third configuration shown in FIG. 3, all four guide plates have been removed. As a result, the cut crop material is ejected radially from the auger 16 along its entire length, as indicated by arrows 32. This produces a wide swath SR of cut crop material. This configuration may be chosen when maximum drying of the crop is required.

Figure 5:
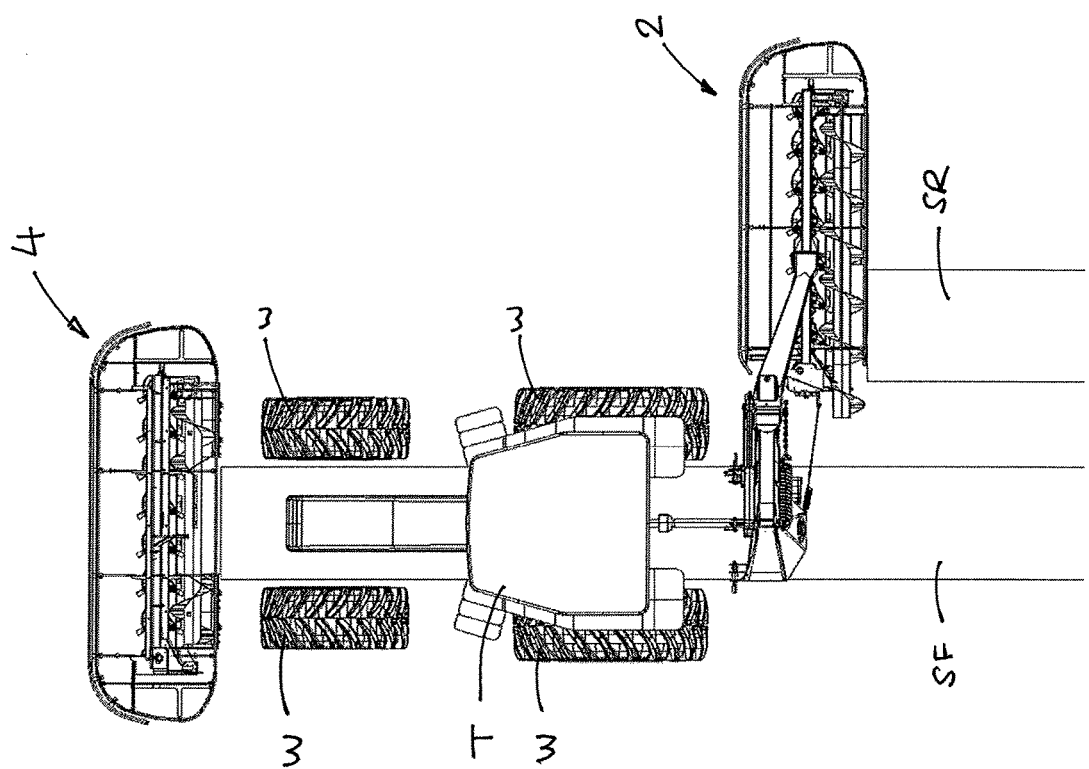
FIG. 5 is a plan view of the first mower mechanism in a second configuration.
Figure 6:
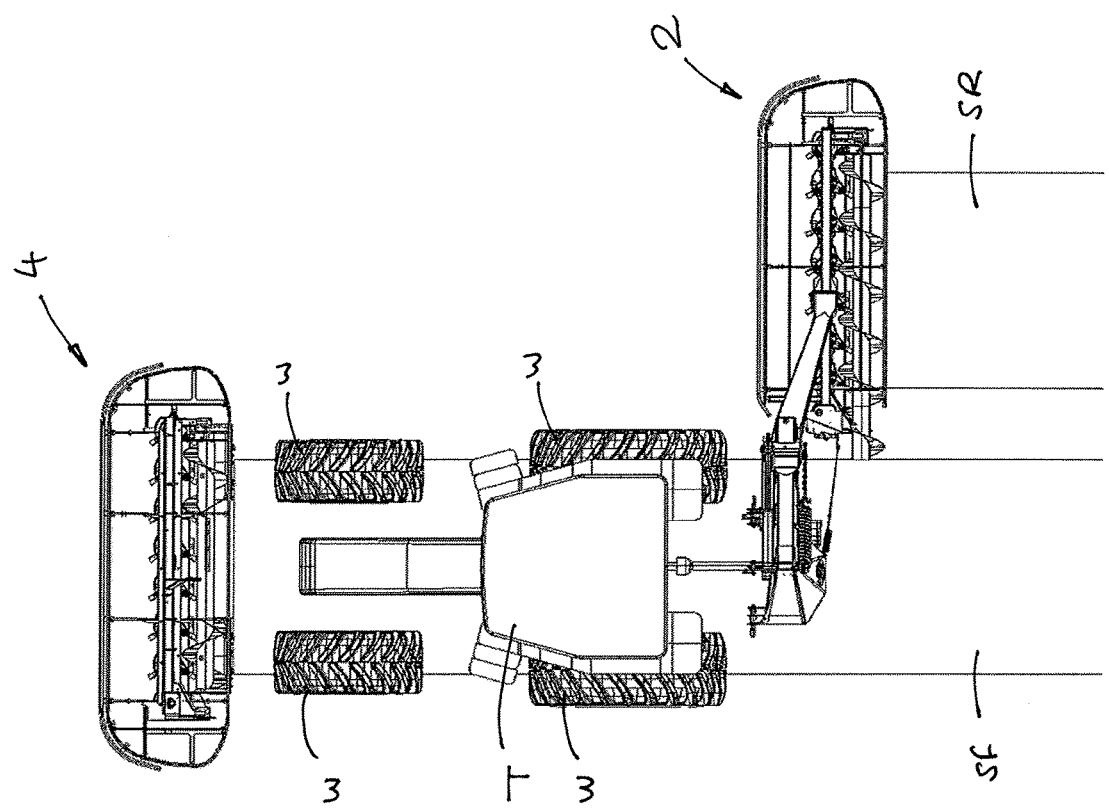
FIG. 6 is a plan view of the first mower mechanism in a third configuration.

FIGS. 4-6 show a mowing machine comprising a tractor T, a rear mower 2 and a front mower 4, and illustrate how the rear mower unit 2 may be configured with the front mower unit 4 to provide different swath widths. The front mower 4 is of the type described in European patent application No. 13163432.1 (Publication No. EP 2789224A1) which includes an auger-type swathing unit and a number of guide plates that can be repositioned or removed to produce either a narrow swath or a wide swath. The rear mower unit 2 comprises a mower of the type shown in FIGS. 1-3.

It should be noted that the rear mower 2 is located behind the rear wheels W of the tractor T so that the axially ejected crop material is deposited behind the rear wheels of the tractor. This avoids any risk of the crop material being crushed into the ground or damaged by the wheels W of the tractor T.

In the arrangement shown in FIG. 4 the front mower 4 is configured to produce a narrow swath SF having a width of approximately 115 cm. The rear mower 2 is configured to eject the cut crop materials axially from the inner end of the auger 16 to produce a rear swath SR. This rear swath SR has a width of about 65 cm and is placed alongside the front swath SF, forming a combined swath SC having a width of approximately 180 cm. This narrow swath is ideal for direct baling or for loading onto medium-sized loader wagons.

FIG. 5 shows the same mowing machine with the rear mower 2 and front mower 4 configured to produce separate swaths SR, SF. As before, the front mower 4 produces a narrow swath SF that has a width of approximately 115 cm and passes between the wheels W of the tractor T. The rear mower 2 has been reconfigured by removing the inner guide plates 26. Cut crop material is therefore ejected radially from the inner end of the rear mower 2 producing a rear swath SR that has a width of approximately 115 cm. The two swaths SF, SR therefore have a combined width of approximately 230 cm, which aids drying. However, the individual swaths are laid on the ground separately, allowing the use of a small rake, while maintaining a good capacity during the subsequent raking operation.

FIG. 6 shows the same mowing machine with the rear mower 2 and front mower 4 configured to produce separate wide swaths SR, SF. The front mower 4 has been configured to produce a swath SF having a width of approximately 210 cm and the rear mower has been configured, by removing the guide plates 26, to produce another wide swath SR having a width of approximately 210 cm. The swath SR comprises crop material that is ejected radially from the auger 16. The total width of the two swaths is therefore approximately 420 cm providing for rapid drying of the crop.

Figure 7:
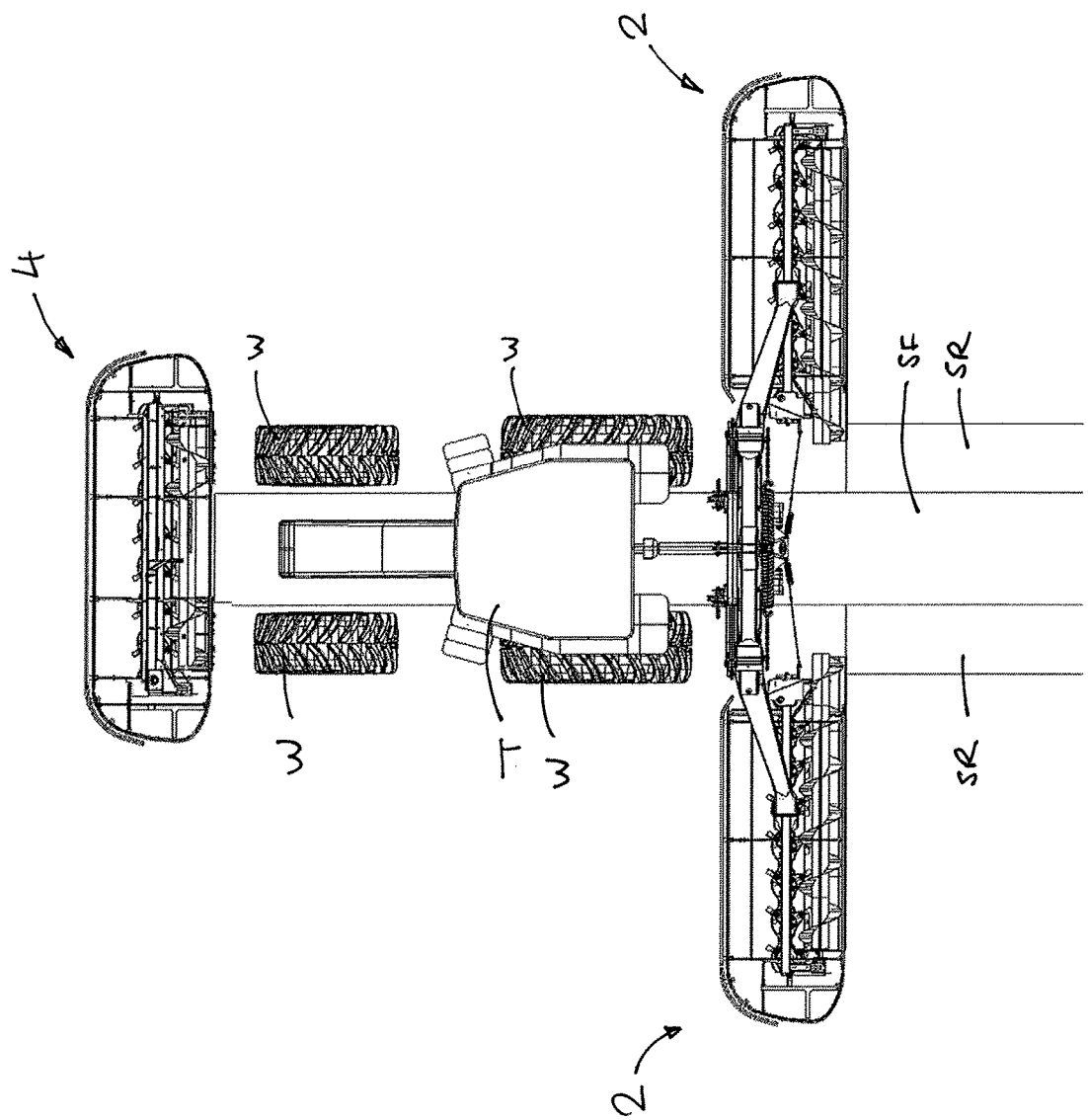
FIG. 7 is a plan view of a second mower mechanism including a front mower unit and two rear mower units in a first configuration.
Figure 8:
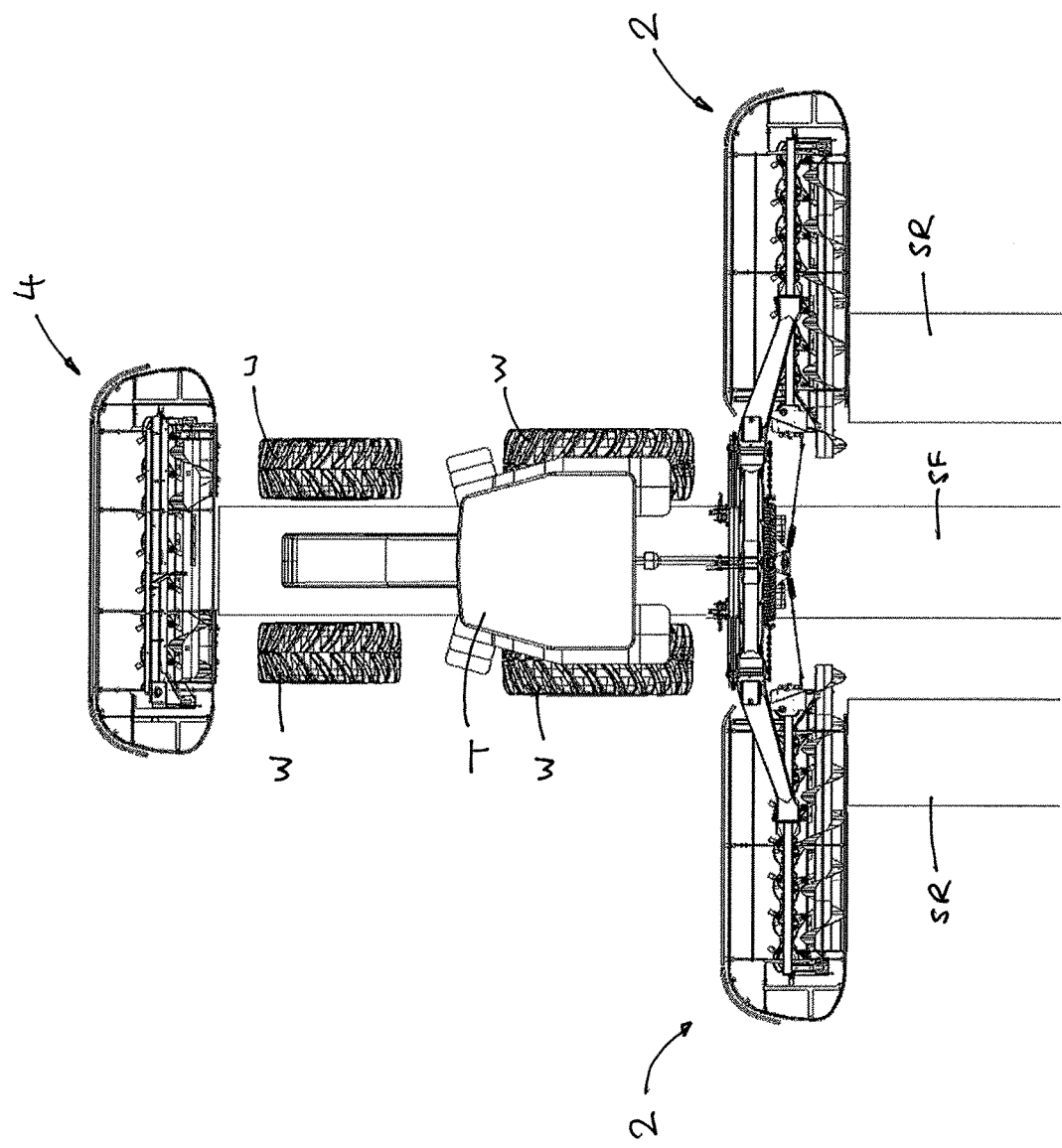
FIG. 8 is a plan view of the second mower mechanism in a second configuration.
Figure 9:
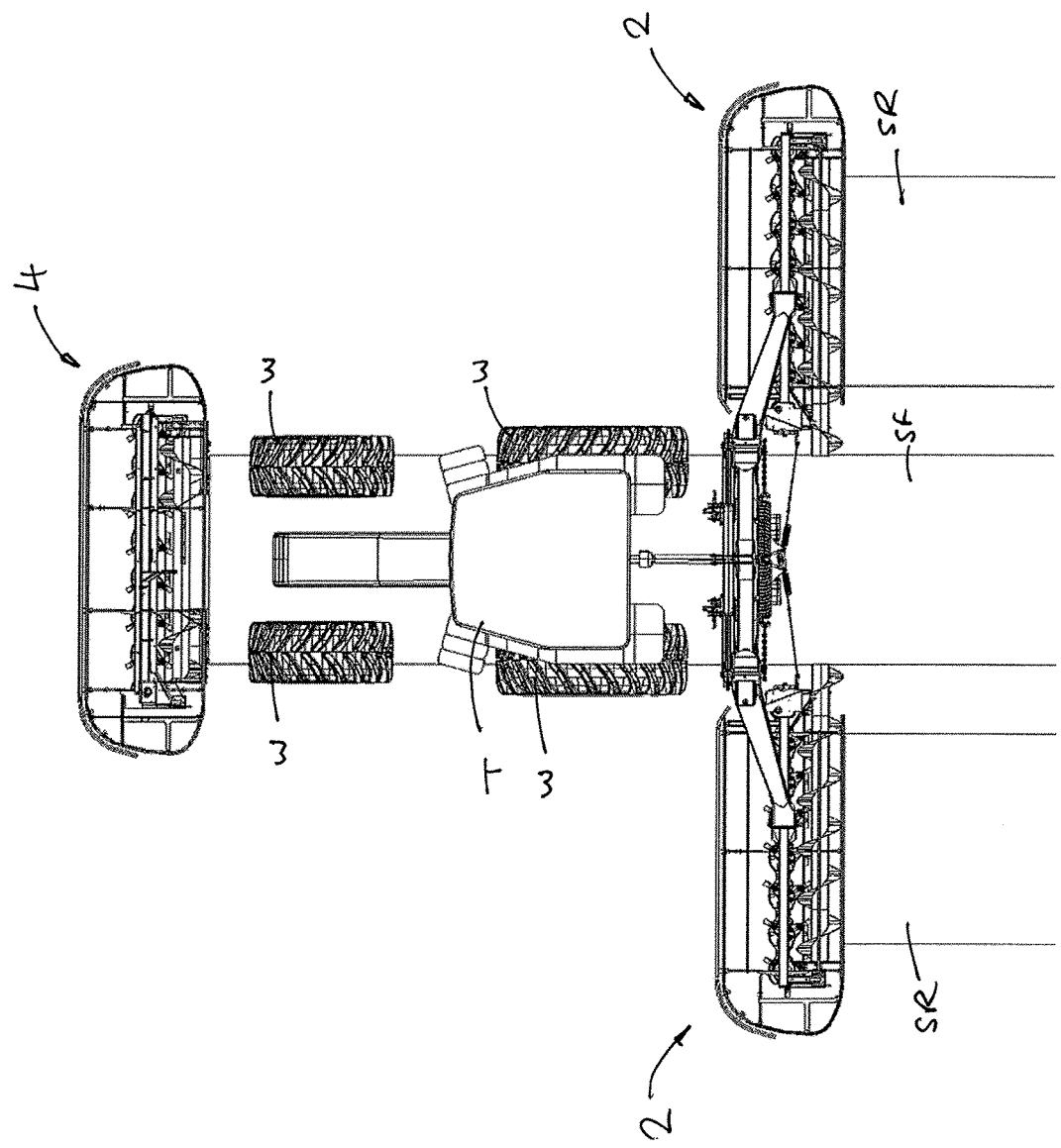
FIG. 9 is a plan view of the second mower mechanism in a third configuration.
Figure 10:
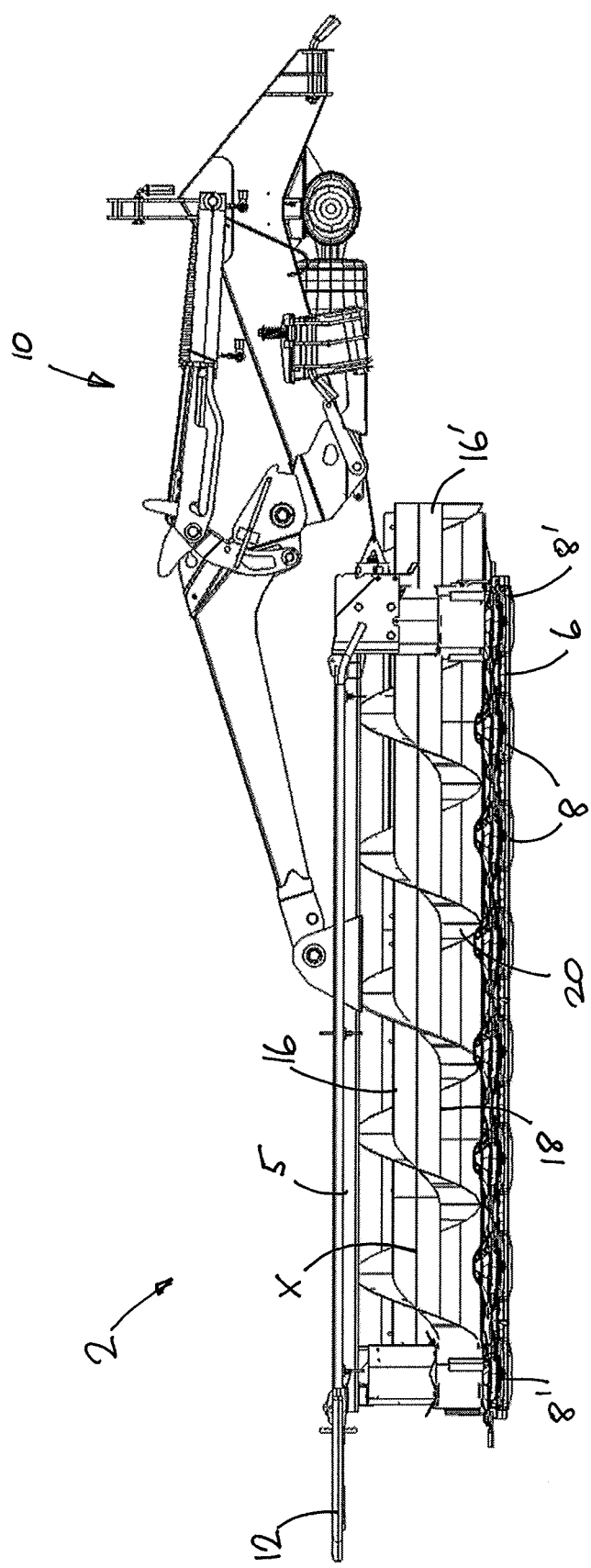
FIG. 10 is a front view of the plain mower in the first configuration.
Figure 11:
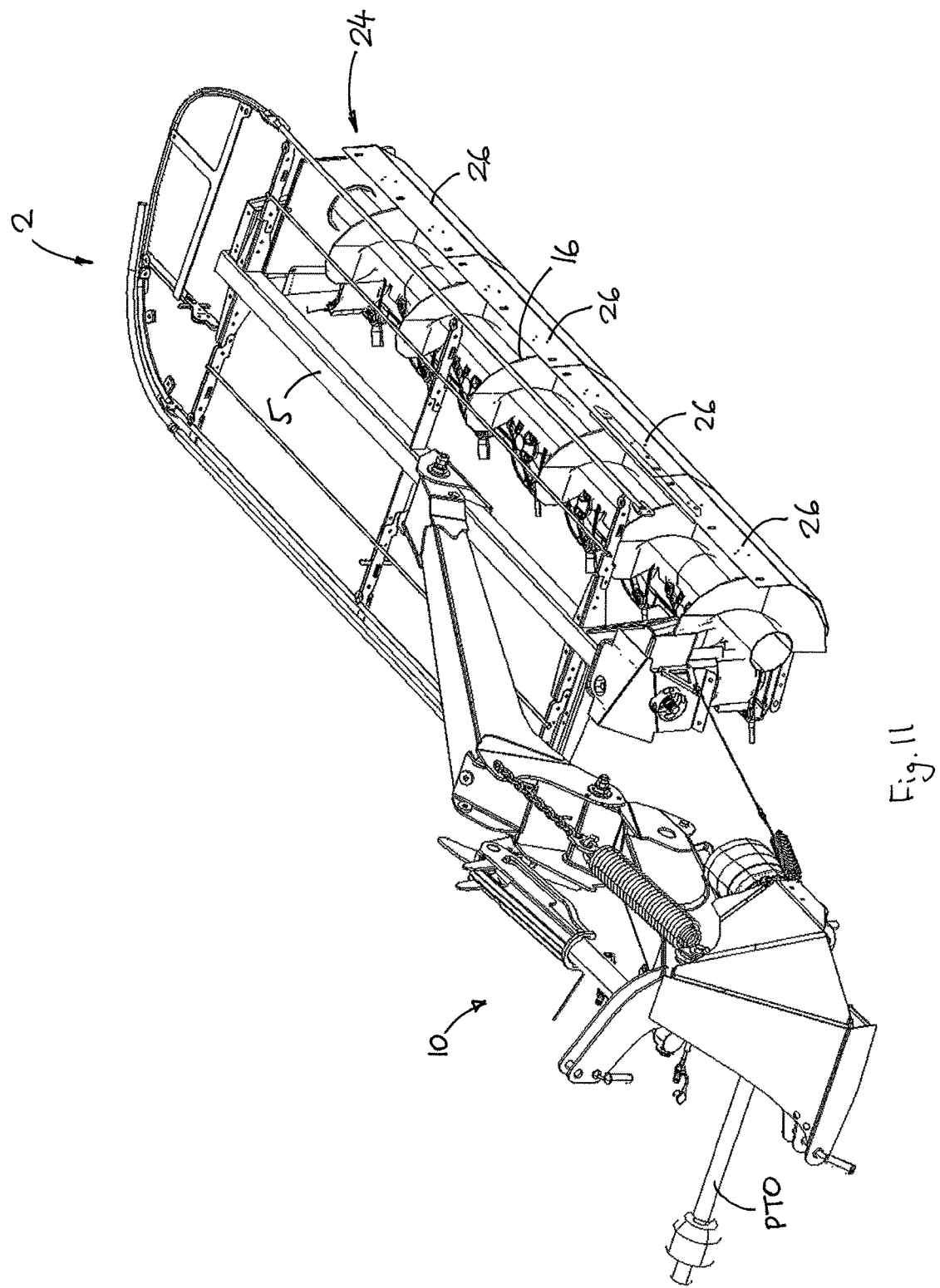
FIG. 11 is an isometric view of the plain mower in the first configuration.

FIGS. 7, 8 and 9 show a mowing machine in which a single front mower unit 4 is combined with a pair of rear mower units 2, which are attached to the rear of the tractor T on either side thereof in a "butterfly" configuration. The front mower 4 is of the type described in European patent application No. 13163432.1 (Publication No. EP 2789224A1) which includes an auger-type swathing unit and a number of guide plates that can be repositioned or removed to produce either a narrow swath or a wide swath. Each of the rear mower units 2 comprises a mower that is substantially similar to the type shown in FIGS. 1-3. As with the first mowing machine, the rear mowers 2 are located behind the rear wheels W of the tractor T so that the axially ejected crop material is deposited behind the rear wheels of the tractor, avoiding any risk of the crop material being crushed or damaged by the wheels W of the tractor.

In the configuration shown in FIG. 7 the front mower 4 is configured to produce a narrow swath SF having a width of approximately 115 cm. The two rear mowers 2 are each configured to eject the cut crop material axially inwards to produce a rear swath SR. The rear swaths SR each have a width of about 65 cm and are placed on either side of the front swath SF, forming a combined swath SC that has width of approximately 245 cm.

FIG. 8 shows the same mowing machine with the rear mowers 2 and front mower 4 configured to produce separate swaths SR, SF. As before, the front mower 4 produces a narrow swath SF that has a width of approximately 115 cm and passes between the wheels W of the tractor T. The rear mowers 2 have been reconfigured by removing the inner guide plates 26. Cut crop material is therefore ejected radially from the inner end of each rear mower 2 producing a rear swath SR that has a width of approximately 115 cm. The front swath SF and the two rear swaths SR therefore have a combined width of approximately 345 cm, which aids drying. The individual swaths are laid on the ground separately, allowing the use of a small rake, while maintaining a good capacity during the subsequent raking operation.

FIG. 9 shows the same mowing machine with the front and rear mowers configured to produce separate wide swaths SF, SR. The front mower 4 is configured to produce a swath 44 having a width of approximately 210 cm and each of the rear mower units 2 is configured to produce a wide swath 46, having a width of approximately 210 cm. The swaths SR from the rear mower units 4 are laid one either side the front swath SF, which produces a total swath width of about 630 cm providing for rapid drying of the crop.

Various modifications of the mower unit described above are possible. For example, fewer or more guide plates 26 may be provided. The guide plates 26 may be arranged to be removed and reattached completely, or they may be arranged to pivot about horizontal or vertical axes to adjust the width of the swath, or they may be arranged to slide laterally.

Although it is preferred to mount the rear mower units behind the tractor so that the axially-ejected crop material cannot be crushed beneath the wheels of the tractor, it is also possible to arrange the rear mower units in front of the tractor so that the axially ejected material passes is combined with the front swath in front of the tractor and passes between the front wheels. Alternatively, the rear mower units may be mounted on either side of the tractor between the front and rear wheels, so that the axially ejected material is combined with the front swath beneath the tractor and passes between the rear wheels.

Although the mower unit described above has three configurations wherein the crop is ejected axially, radially in a narrow swath or radially in a wide swath, a simpler mower unit may be provided that features only two configurations, providing for axial and radial ejection of the crop. The width of the swath formed by the radially ejected crop may be either narrow or wide, depending on the size of the adjustable guide plate.

The invention claimed is:

1. A plain mower comprising:
   a plurality of rotary cutters for cutting a crop; and
   a swathing unit for forming cut crop material into a swath,
   the swathing unit including:
      an auger that rotates about an axis to transport crop material axially through the swathing unit, and
      at least one guide plate,
   wherein the swathing unit can be configured in a first configuration in which the guide plate extends around at least a part of the auger to hold the crop material in contact with the auger and the crop material is ejected axially from an end of the auger, in a second configuration in which the guide plate is displaced away from the auger and the crop material is ejected radially from the auger, and in a third configuration in which the crop material is ejected radially from the auger, the swath widths in said second and third configurations being different.

2. The plain mower according to claim 1, wherein the guide plate is displaced away from the auger when the swathing unit is in the third configuration to allow the crop material to be ejected radially from the auger.

3. The plain mower according to claim 1, wherein the swathing unit includes a plurality of guide plates that can be reconfigured separately to adjust the position and/or the width of a swath formed by the swathing unit.

4. The plain mower according to claim 1, wherein the rotary cutters include disc cutters.

5. The plain mower according to claim 1, including a suspension mechanism for suspending the mower in a laterally displaced position relative to a tractor.

6. A mower mechanism comprising:
a rear mower unit comprising the plain mower according to claim 1, and
a front mower unit,
wherein the rear mower unit and the front mower unit are configured for attachment to a tractor such that the front mower unit is in front of the tractor and the rear mower unit is located towards the rear of the tractor in a laterally displaced position, whereby:
when the rear mower unit is in the first configuration, the axially-ejected crop material is combined with crop material cut by the front mower to produce a single swath, and
when the rear mower unit is in the second configuration, the radially-ejected crop material forms a swath that is displaced laterally from the crop material cut by the front mower unit.

7. A mowing machine comprising:
the mower mechanism according to claim 6, wherein the mower mechanism is mounted on the tractor; and
wherein the tractor has front and rear wheels.

8. The mowing machine according to claim 7, wherein the rear mower unit is configured such that, when it is in the first configuration, the axially ejected crop material is deposited behind the rear wheels of the tractor.

9. The mowing machine according to claim 8, wherein the rear mower unit is located behind the rear wheels of the tractor.

10. The mowing machine according to claim 8, including a plurality of rear mower units.

11. A plain mower comprising:
a plurality of rotary cutters for cutting a crop; and
a swathing unit for forming cut crop material into a swath, the swathing unit including:
an auger that rotates about an axis to transport crop material axially through the swathing unit, and
at least one guide plate,
wherein the swathing unit can be configured in a first configuration in which the guide plate extends around at least a part of the auger to hold the crop material in contact with the auger and the crop material is ejected axially from an end of the auger, and in a second configuration in which the guide plate is displaced away from the auger and the crop material is ejected radially from the auger, and
wherein the swathing unit includes a plurality of guide plates that can be reconfigured separately to adjust the position and/or the width of a swath formed by the swathing unit.

12. The plain mower according to claim 11, wherein the rotary cutters include disc cutters.

13. The plain mower according to claim 11, including a suspension mechanism for suspending the mower in a laterally displaced position relative to a tractor.

* * * * *